(12) United States Patent
Krishnan

(10) Patent No.: US 8,681,695 B1
(45) Date of Patent: Mar. 25, 2014

(54) SINGLE ADDRESS PREFIX ALLOCATION WITHIN COMPUTER NETWORKS

(75) Inventor: Suhir Krishnan, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 758 days.

(21) Appl. No.: 12/578,935

(22) Filed: Oct. 14, 2009

(51) Int. Cl.
*H04W 4/00* (2009.01)

(52) U.S. Cl.
USPC ...... 370/328; 370/349; 370/389; 370/395.54; 370/401

(58) Field of Classification Search
None
See application file for complete search history.

(56) References Cited

U.S. PATENT DOCUMENTS

| | | | |
|---|---|---|---|
| 6,185,184 B1 * | 2/2001 | Mattaway et al. | 370/230 |
| 8,065,515 B2 * | 11/2011 | Droms et al. | 713/153 |
| 2009/0040964 A1 * | 2/2009 | Zhao et al. | 370/328 |
| 2009/0204691 A1 * | 8/2009 | Xia et al. | 709/220 |

OTHER PUBLICATIONS

Droms et al., "Dynamic Host Configuration Protocol for IPv6 (DHCPv6)," Network Working Group, RFC 3315, Jul. 2003, 95 pp.
Droms et al., DNS Configuration options for Dynamic Host Configuration Protocol for IPv6 (DHCPv6), Network Working Group, RFC 3646, Dec. 2003, 7 pp.
Narten et al., "Neighbor Discovery for IP version 6 (IPv6)," Network Working Group, RFC 4861, Sep. 2007, 98 pp.
Troan et al., "IPv6 Prefix Options for Dynamic Host Configuration Protocol (DHCP) version 6," Network Working Group, RFC 3633, Dec. 2003, 18 pp.
Loughney, "IPv6 Node Requirements," Network Working Group, RFC 4294, Apr. 2006, 21 pp.
Thomson et al., "IPv6 Stateless Address Autoconfiguration," Network Working Group, RF 4862, Sep. 2007, 29 pp.
Website, www.cisco.com/go/ipv6, accessed Sep. 4, 2009, 2 pp.
The Broadband Forum, Draft PD-192, "Residential Gateway (RG) IPv6 Requirements (updates to TR-124)," Revised Jul. 2009, 48 pp.
Allocchio et al., "GSTN Address Element Extensions in E-mail Services," Network Working Group, RFC 2846, Jun. 2000, 33 pp.

* cited by examiner

*Primary Examiner* — Jay Y Lee
(74) *Attorney, Agent, or Firm* — Shumaker & Sieffert, P.A.

(57) ABSTRACT

In general, techniques are described for single prefix address allocation within computer networks. Typically, a network device that allocates addresses within a computer network implements the techniques. The network device comprises an interface and a control unit. The interface receives first and second messages from a subscriber network. The first message requests at least one address be allocated to the subscriber network according to a first address allocation mechanism. The second message requests at least one address be allocated to the subscriber network in accordance with a second address allocation mechanism. The control unit automatically determines a topology of the subscriber network based on the second message. Based on the determined topology, the control unit selectively allocates either a single network address prefix or one or more addresses of the network address prefix in response to the second message without allocating an address in response to the first message.

20 Claims, 5 Drawing Sheets

SINGLE ADDRESS PREFIX ALLOCATION WITHIN COMPUTER NETWORKS

TECHNICAL FIELD

The invention relates to computer networks and, more particularly, allocating addresses within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

To route the packets through the computer network, each network device may be allocated an address that uniquely identifies each of network devices within a particular portion of and, possibly globally within, the computer network. Each packet may then include a source address uniquely identifying the network device that originated the packet and a destination address uniquely identifying the network device to which the packet is destined. Intermediate devices, referred to as routers, may route the packets to the destination device based on the destination address included within the packet.

These network addresses typically comprise layer 3 (L3) or network layer addresses, such as an Internet protocol (IP) address. Two different version of IP are typically employed in the computer network for L3 routing purposes. A first version of IP, referred to as IP version 4 (IPv4), is widely deployed in most packet-based computer networks. IPv4 however has a limited address space, which may limit the ability to assign global addresses as more and more network devices join the computer network. Various techniques to overcome this address space limitation increase computer network complexity and thereby increase administrative costs. A more recent version IP, referred to as IP version 6 (IPv6), expands the address space to overcome the address space limitations of IPv4 while also improving various other limitations of IPv4.

IPv6 provides for two mechanisms by which to allocate addresses to network devices and, more specifically, so-called "hosts" in terms of IPv6. According to IPv6, the term "hosts" denote any type of network device except for routers. IPv6 provides a first form of address allocation referred to as "stateless address auto-configuration." Using stateless address auto-configuration, a host may determine an address for use within at least a portion of the computer network, e.g., a sub-network (which is often referred to as a "subnet"). IPv6 also provides a second form of address allocation referred to as "stateful address configuration," which is better known by the protocol that enables this stateful address configuration, dynamic host configuration protocol version 6 (DHCPv6).

While two different address assignment or configuration mechanisms provides flexibility to address various network configurations, often such flexibility leads to complications and inefficiencies when administering large computer networks. For example, service provider networks that facilitate access to a public computer network, such as the Internet, typically support both stateless address auto-configuration and DHCPv6 that both enable allocation of addresses, or a set of addresses denoted by an address prefix, to network devices within a given subscriber's network. To support both address allocation mechanisms, the service provider provisions two address prefixes for each subscriber, reserving one for stateless address auto-configuration and another for DHCPv6. Depending on the topology of the subscriber's network, however, the network devices of a given subscriber network may only require one of these provisioned prefixes, thereby resulting in inefficient use of address prefixes.

SUMMARY

In general, techniques are described for enabling single prefix address allocation within computer networks, such as access networks maintained by service providers. A network device, such as an edge router of the service provider access network, implements the techniques to promote more efficient address provisioning in that administrators only need to provision a single address prefix per subscriber even in environments where some subscriber networks may request two or more address prefixes. The techniques involve automatically determining a topology of a subscriber network based on a DHCPv6 message requesting one or more addresses be allocated to the subscriber network. Based on the determined topology, the techniques dynamically determine whether to allocate an address prefix, which denotes two or more subsequently numbered addresses, or a single address to the subscriber network. Requests for an address using other address allocation mechanisms, e.g., stateless address auto-configuration, are handled seamlessly without allocating additional address prefixes and without affecting the operation of either the subscriber network or the access network.

In this respect, administrators of service provider networks are able to configure edge routers to implement a single address prefix allocation policy with respect to a single address allocation mechanism, e.g., DHCPv6, rather than configure multiple address allocation mechanism, e.g., stateless address auto-configuration and DHCPv6. Consequently, the techniques promote more efficient network configuration, management and maintenance, as only one set of configuration data need be defined to implement the techniques. Further, the techniques reduce the number of prefixes that need be allocated per subscriber to one, thereby reducing inefficiencies that may result when two or more address prefixes are provisioned but only a subset of those two or more address prefixes are utilized.

In one example environment, an edge router of a service provider access network implements the techniques as described above. The edge router comprises a control unit that implements, in one embodiment, DHCPv6, and stores data defining an address pool, which represents a pool of Internet protocol version 6 (IPv6) addresses available for allocation to subscriber networks coupled to the edge router. The control unit also includes at least one interface by which to receive DHCPv6 messages. The edge router resides at the edge of the subscriber network and interfaces with subscriber networks.

The subscriber networks typically have one of two common network topologies. In the first topology, the subscriber network comprises one or more network devices, which in terms of IPv6 are referred to as "hosts." The subscriber devices may also be referred to as customer premise equipment (CPE). The term "hosts" again refers to any network device except for routers. Each of these one or more hosts typically request a single IPv6 address via a DHCPv6 message referred to as a DHCPv6 solicit message, where this DHCPv6 message includes an option requesting a particular type, e.g., temporary or non-temporary, of IPv6 address. In this instance, the DHCPv6 implementation in the control unit of the edge router allocates an address from a single address prefix in response to each request.

In the second common subscriber network topology, the subscriber network includes the same one or more hosts but also includes a residential gateway (RG), such as a wireless router, to which each of the hosts interface to gain access to the service provider access network and eventually the public network, e.g., the Internet. In this topology, the RG generally issues a request using a stateless address auto-configuration mechanism referred to as "neighbor discovery," which is abbreviated as ND, in IPv6. More particularly, the RG requests a link-layer address from the edge router using a router solicitation (RS) functionality of ND, which is abbreviated as ND/RS. The edge router then assigns this link-layer address to an interface of the RG facing the edge router. The RG also requests an IPv6 address prefix using DHCPv6, where the RG allocates an address from the allocated address prefix to an interface of the RG facing the hosts and to each of the hosts. To request this address prefix via DHCPv6, the RG issues a DHCPv6 solicit message to the edge router that specifies at least one option indicating prefix delegation is requested.

In this instance, the control unit does not allocate an address or address prefix in response to this ND/RA address request when the link-layer address has been assigned to the interface of the RG facing the edge router. In response to this non-response (which amounts to a denial of the ND/RA address request), the RG instead determines a default link-local IPv6 address in accordance with IPv6 and assigns this link-local IPv6 address to the interface facing the edge router. In response to the RG DHCPv6 solicit message, the edge router responds with a DHCPv6 message allocating the single prefix for use by the RG. With respect to both common subscriber network topologies, the techniques therefore require only that service providers provision a single address prefix and thereby promoting the various benefits detailed above.

In one embodiment, a method of address allocation within a computer network, the method comprising receiving, with a network device of the computer network, a first message from a subscriber network connected to the computer network, wherein the first message requests at least one address be allocated to the subscriber network in accordance with a first address allocation mechanism and receiving, with the network device, a second message from the same subscriber network, wherein the second message requests at least one address be allocated to the subscriber network in accordance with a second address allocation mechanism that is different from the first address allocation mechanism. The method also comprises automatically determining, with the network device, a topology of the subscriber network based on the second message, and selectively allocating, with the network device, either a single network address prefix or one or more addresses of the network address prefix in response to the second message based on the determined topology of the subscriber network without allocating an address in response to the first message so as to avoid allocating one or more addresses from another network address prefix different from the network address prefix.

In another embodiment, a network device that allocates addresses within a computer network comprises at least one interface that receives a first message from a subscriber network connected to the computer network, wherein the first message requests at least one address be allocated to the subscriber network in accordance with a first address allocation mechanism and receives a second message from the same subscriber network, wherein the second message requests at least one address be allocated to the subscriber network in accordance with a second address allocation mechanism that is different from the first address allocation mechanism. The network device also comprises a control unit that automatically determines a topology of the subscriber network based on the second message and selectively allocates either a single network address prefix or one or more addresses of the network address prefix in response to the second message based on the determined topology of the subscriber network without allocating an address in response to the first message so as to avoid allocating one or more addresses from another network address prefix different from the network address prefix.

In another embodiment, a computer-readable storage medium comprises instructions for causing a programmable processor to receive, with a network device of the computer network, a first message from a subscriber network connected to the computer network, wherein the first message requests at least one address be allocated to the subscriber network in accordance with a first address allocation mechanism, receive, with the network device, a second message from the same subscriber network, wherein the second message requests at least one address be allocated to the subscriber network in accordance with a second address allocation mechanism that is different from the first address allocation mechanism, automatically determine, with the network device, a topology of the subscriber network based on the second message, and selectively allocate, with the network device, either a single network address prefix or one or more addresses of the network address prefix in response to the second message based on the determined topology of the subscriber network without allocating an address in response to the first message so as to avoid allocating one or more addresses from another network address prefix different from the network address prefix.

In another embodiment, a network system comprises a public network, a subscriber network that includes a residential gateway device and a service provider network comprising a network device that interfaces with the residential gateway device to enable the subscriber network to access the public network. The network device comprises at least one interface that receives a first message from the subscriber network connected to the service provider network, wherein the first message requests at least one address be allocated to the subscriber network in accordance with a first address allocation mechanism and receives a second message from the same subscriber network, wherein the second message requests at least one address be allocated to the subscriber network in accordance with a second address allocation mechanism that is different from the first address allocation mechanism. The network device also comprises a control unit that automatically determines a topology of the subscriber network based on the second message and selectively allocates either a single network address prefix or one or more addresses of the network address prefix in response to the second message based on the determined topology of the subscriber network without allocating an address in response to the first message so as to avoid allocating one or more addresses from another network address prefix different from the network address prefix.

In another embodiment, a network system comprises a public network, a subscriber network that includes a residential gateway device, and a service provider network that provides access to the public network. The service provider network comprises an authentication server that authenticates the one or more subscriber networks before allowing the subscriber networks to gain access to the service provider network and a network device that interfaces with the residential gateway device to enable the subscriber network to access the public network. The network device comprises at least one interface that receives a first message from the subscriber network connected to the service provider network, wherein the first message requests at least one address be allocated to the subscriber network in accordance with a first address allocation mechanism and receives a second message from the same subscriber network, wherein the second message requests at least one address be allocated to the subscriber network in accordance with a second address allocation mechanism that is different from the first address allocation mechanism. The network device also comprises a control unit that communicates with the authentication server to authenticate the subscriber network as permitted to interface with the service provider network to access the public network, receives a single network address prefix from the authentication server in response to successfully authenticating the subscriber network, automatically determines a topology of the subscriber network based on the second message and selectively allocates either a single network address prefix or one or more addresses of the received network address prefix in response to the second message based on the determined topology of the subscriber network without allocating an address in response to the first message so as to avoid allocating one or more addresses from another network address prefix different from the network address prefix.

In another embodiment, a network system comprises a public network, a subscriber network that includes a residential gateway device, and a service provider network that provides access to the public network. The service provider network includes a network device that interfaces with the residential gateway device to enable the subscriber network to access the public network and a dynamic host configuration protocol version six (DHCPv6) that allocates network addresses in accordance with DHCPv6. The network device comprises at least one interface that receives a first message from the subscriber network connected to the service provider network, wherein the first message requests at least one address be allocated to the subscriber network in accordance with a first address allocation mechanism and receives a second message from the same subscriber network, wherein the second message requests at least one address be allocated to the subscriber network in accordance with a second address allocation mechanism that is different from the first address allocation mechanism. The network device also comprises a control unit that automatically determines a topology of the subscriber network based on the second message, parses the second message in accordance with a single prefix allocation policy to selectively remove one or more options related to the scope of the address allocation request to generate an updated second message, forwards the updated second message to the DHCPv6 server, receives a response message from the DHCPv6 allocating either a single network address prefix or one or more addresses of a single network address prefix in response to the updated second message, and forwards the response message to the subscriber network so as to selectively allocate either the single network address prefix or the one or more addresses of the network address prefix without allocating an address in response to the first message so as to avoid allocating one or more addresses from another network address prefix different from the network address prefix.

In another embodiment, a method of address allocation within a computer network, the method comprising receiving, with a network device of the computer network, a first message from a subscriber network connected to the computer network, wherein the first message requests at least one address be allocated to the subscriber network in accordance with a stateless address auto-configuration address allocation mechanism, determining whether to use the stateless address auto-configuration address allocation mechanism or a stateful address allocation mechanism to allocate either a single network address prefix or one or more network addresses included within the network address prefix according to a single address prefix policy that only enables allocation of the single address prefix or addresses included within the single network address prefix, and automatically allocating either the single network address prefix or one or more of the network addresses included within the network address prefix using the determined address allocation mechanism.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
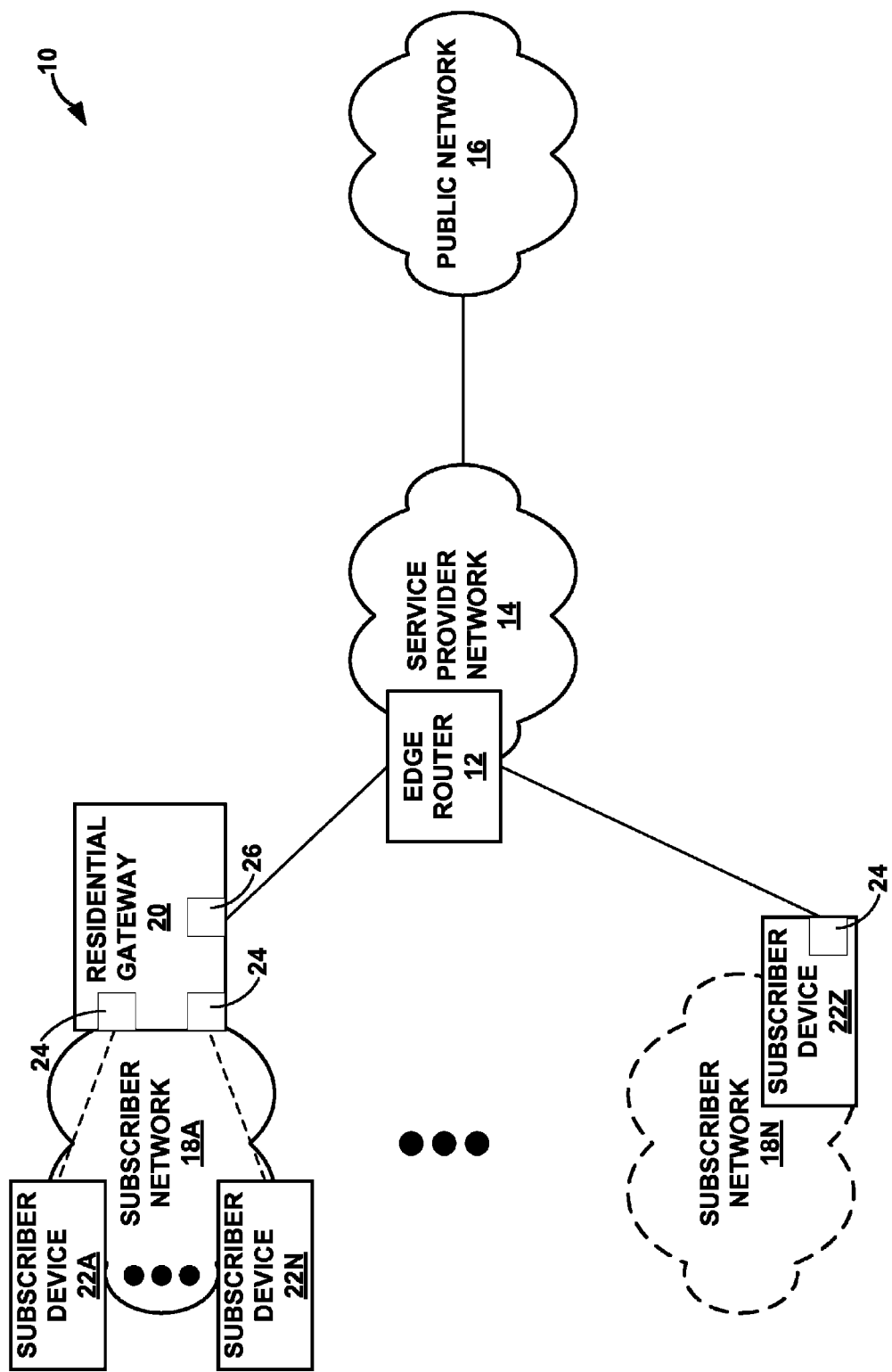
FIG. 1 is a block diagram illustrating an exemplary network system in which an edge router implements the single address prefix allocation techniques described in this disclosure.

FIG. 1 is a block diagram illustrating an exemplary network system 10 in which an edge router 12 implements the single address prefix allocation techniques described in this disclosure. While described with respect to a particular network device, e.g., edge router 12, the techniques should not be strictly limited to this example edge router 12. Instead, the techniques may apply to any network device that allocates prefixes to other network devices, sub-networks (which are referred to commonly as "subnets") or any other portion of a computer network.

As shown in the example of FIG. 1, network system 10 includes a service provider network 14, a public network 16 and a plurality of subscriber network 18A-18N ("subscriber networks 18"). Service provider (SP) network 14 commonly represents any network owned and operated by a service provider that provides access to either a private network or a public network, such as public network 16. Typically, service provider network 14 comprises a one or more computer networks (not shown in detail in the example of FIG. 1 for illustrative purposes) that interoperate to provide so-called "Internet services" to subscriber premises. The one or more computer networks include a plurality of access network and a backend network. Each of the plurality of access network provides physical access, in terms of infrastructure such as network links, physical buildings, and network devices (e.g., edge router 12), to public network 16. The backend network often provides management, maintenance, provisioning and other related services to manage, maintain and provision the access networks. In this respect, service provider network 14 includes a number of networks that interoperate so as to provide access to public network 16.

Public network 16 represents a computer network accessible by the public via network devices. Although not shown in the example of FIG. 1, public network 16 includes a number of interconnected network devices, such as print servers, data servers, application servers, video servers, laptops, workstations, desktop computers, personal digital assistants (PDAs), so-called "netbooks," cellular phones (including so-called "smart phones"), voice over Internet Protocol (VoIP) devices, set-top boxes (STBs), and any other device capable of executing a network protocol to connect to and access another network device. For example, public network 16 may represent the Internet.

In any event, public network 16 typically comprises a packet-based computer network that implements a layer-3 protocol, such an Internet protocol (IP). The term "layers" followed by a number denotes the corresponding numbered layer in the Open Systems Interconnection (OSI) model. As a result, public network 16 is often referred to as a packet-based or layer-3 computer network. Each of service provider network 14 and subscriber networks 18 also implement IP or some other layer-3 protocol and are often also referred to as packet-based or layer-3 computer network.

Each of subscriber networks 18 represent a computer network owned, operated and maintained by a subscriber to an access service (or so-called "Internet service" or "data service") provided by service provider network 14. As subscribers typically configure and operate each of subscriber networks 18 to suit a particular purpose unique to the subscriber, subscriber networks 18 may be configured in any number of configurations. The layout or interconnectivity of various devices within a particular one of subscriber networks 18 is referred to as a "network topology."

Two exemplary subscriber network topologies are shown in FIG. 1. The first network topology is illustrated with respect to subscriber network 18A. In this first network topology, the subscriber has deployed a residential gateway 20 within subscriber network 18A that provides a gateway by which a plurality of subscriber devices 22A-22N included within subscriber network 18A couple to edge router 12 and thereby access public network 16. Residential gateway 20 typically comprises a wireless router or other home networking device, such as a hub, a switch, a router, a cable modem, a digital subscriber line (DSL) modem or any other device that provides access or otherwise connects subscriber device 22A-22N to public network 16 or other wide area network (WAN). Often, residential gateway 20, which is commonly denoted as RG 20, includes a plurality of local area network (LAN) interfaces, either real or virtual, and at least one WAN port, which is often real. Typically, residential gateway 20 implements a series of protocols for Ethernet connectivity denoted as Institute of Electrical and Electronics Engineers (IEEE) 802.1x, over the LAN interfaces. The interfaces are denoted in the example of FIG. 1 as LAN interfaces 24 and WAN interface 26.

The second network topology is illustrated with respect to subscriber network 18N. In this second network topology, subscriber device 22Z couples to edge router 12 via a LAN interface 22Z without any intermediate residential gateway 20 positioned between edge router 12 and subscriber device 22Z. Subscriber devices 22A-22Z ("subscriber devices 22") comprise one or more of a networked or so-called "wireless" television, a laptop computer, a desktop computer, a workstation, a cellular phone (including so-called "smart phones", a so-called "netbook," a PDA, a set-top box (STB), or any other device capable of accessing a network, such as public network 16.

As subscriber network 18N includes only a single subscriber device 22Z and therefore does not necessarily represent a network per se, subscriber network 18N is shown with a dashed line to denote that another network device may be required before subscriber network 18N constitutes a network in the strictest sense of the term. However, for purposes of this disclosure a single network device, such as subscriber device 22Z, is considered to form a subscriber network 18N, considering that other devices may access public network 16 through subscriber device 22Z in this topology. In any event, the term "subscriber network: as used herein comprises one or more devices owned, operated and maintained by a subscriber to access a network, such as public network 16.

In any event, edge router 12 facilitates access by one or more subscriber devices 22 to public network 16 regardless of the network topology in which these subscriber devices 22 have been configured. Edge router 12 therefore represents any network device capable of providing or otherwise facilitating access to a network, either private or public, by devices, such as subscriber device 22, included within one or more networks, such as subscriber networks 18. To provide this access, edge router 12 often facilitates the allocation of addresses to subscriber networks 18. Edge router 12 implements the techniques described in this disclosure to allocate only a single address prefix regardless of the network topology of subscriber network 18, thereby reducing maintenance and administrative costs associated with maintaining access networks of service provider network 14.

In accordance with the techniques described by way of example in this disclosure, edge router 12 receives a first message from a subscriber network, such as one of subscriber networks 18. With respect to the first network topology of subscriber network 18A, residential gateway 20 initially sends this first message in order to resolve an address for use by WAN interface 26 of residential gateway 20. This first message is commonly sent in accordance with a first address allocation mechanism, which is referred to as a stateless address auto-configuration address allocation mechanism. The stateless address auto-configuration mechanism is typically referred to as a stateless address auto-configuration protocol. The stateless address auto-configuration protocol involves a process by which to determine a link-layer address and resolve a global IP version 6 (IPv6) address using a sub-protocol or mechanism defined or included within IPv6 referred to as neighbor discovery (ND) or, in some instances, a neighbor discover protocol (NDP).

To illustrate, residential gateway 20 sends an ND route solicitation (RS) message, typically via multicast, upon powering up WAN interface 26 in attempt to learn a routing prefix of the global IPv6 address from the nearest router subscribing to the same multicast stream. The routing prefix refers to a first 64 bits of a 128-bit global IPv6 address. Assuming edge router 12 subscribes to this same multicast stream, edge router 12 receives the ND RS (or ND/RS) message in accordance with ND. In some instances, the edge router 12 responds to the ND/RS with a ND routing advertisement (ND/RA) message so as to establish a next hop router to residential gateway 20, but not include or otherwise allocate an address in this ND/RA message. From the perspective of residential gateway 12, the first message sent by residential gateway 20 to edge router 12 represents a request that at least one address be allocated to subscriber network 18A in accordance with a first address allocation mechanism.

In some instances, an administrator or other network personnel or operator may not even configure the first address allocation mechanism, e.g., ND, within edge router 12, which disables support for ND within edge router 12. Consequently edge router 12 does not implement ND and therefore does not respond to the ND/RS message with the typical solicited routing advertisement (RA). Edge router 12, in these instances, would then not implement any of the other ND functionality set forth in more detail in a request for comments (RFC) 4861, entitled "Neighbor Discovery for IP version 6 (IPv6)," dated September 2007 and incorporated in its entirety herein. Moreover, the administrator may not even configure the stateless address auto-configuration protocol within edge router 12, and edge router 12, would not implement any of the other aspects of the stateless auto-configuration protocol set forth in more detail in an RFC 4862, entitled "IPv6 Stateless Address Autoconfiguration," dated September 2007 and incorporated in its entirety herein.

In response to the ND/RA message's failure to allocate a network address, residential gateway 20 determines a link-local IPv6 address and allocates this link-local IPv6 address for use by WAN interface 26. According to the above incorporated RFC 4862, a link-local address comprises an address having link-only scope that can be used to reach neighboring nodes attached to the same link. In this instance, the line between residential gateway 20 and edge router 12 represents a link to which WAN interface 26 of residential gateway 20 couples. Assigning a link-local IPv6 address to WAN interface 26 effectively limits the scope of traffic originating from WAN interface 26 (e.g., traffic addressed with the link-local IPv6 address as the source address) to this link. This link-local traffic therefore only travels from residential gateway 20 to edge router 12, where edge router 12 is prohibited from forwarding this link-local traffic any further within service provider network 14 or on to public network 16 in accordance with IPv6.

Residential gateway 20 also forwards a second message to edge router 12 that requests an IPv6 global address prefix be allocated to subscriber network 18A in accordance with a second address allocation mechanism that is different from the first address allocation mechanism, e.g., a stateful address allocation mechanism. A stateful address allocation mechanism generally involves a protocol by which to negotiate a lease for one or more IPv6 address. One example stateful address allocation protocol for use with IPv6 comprises a dynamic host configuration protocol version 6 (DHCPv6). Upon powering up one or more of LAN interfaces 24 and/or WAN interface 26, residential gateway 20 typically forwards a DHCPv6 Solicit message to edge router 12 to locate a DHCP server from which to requests the IPv6 global address prefix.

Residential gateway 20 specifies one or more options within the DHCPv6 Solicit message that define a type of address requested. IPv6 enables a number of different types of addresses, including temporary addresses, non-temporary addresses, and prefix addresses. Residential gateway 20 specifies in one or more optional options (type-length-value or TLV fields) of the DHCPv6 Solicit message one or more types of addresses, respectively. In the instance of subscriber network 18 as described above, residential gateway 20 requests an IPv6 global address prefix in the DHCPv6 Solicit message by defining a TLV field within the DHCPv6 Solicit message that indicates a prefix address is requested.

In the example of FIG. 1, edge router 12 implements DHCPv6 or some other stateful address allocation mechanism by which to store and manage a pool of IPv6 addresses. In accordance with DHCPv6, edge router 12 receives the DHCPv6 Solicit message from residential gateway 20, parses this Solicit message and determines that residential gateway 20 requests an IPv6 global address prefix. Edge router 12 responds in one of two ways in accordance with DHCPv6, one of which involves a so-called "rapid commit." Under either of the two ways, edge router 12 responds with a lease for an IPv6 global address prefix.

In IPv6, an address space is defined to include $2^{128}$ distinct or global IP addresses, where an IPv6 address prefix comprises two or more contiguous or sequential addresses within this global IP address space. The first 64-bit portion of an IPv6 global IP address comprises a (sub-) network prefix, which may be referred to as a routing prefix. The second 64-bit portion of the IPv6 global IP address comprises a host address usually based off of a media access control (MAC) address of physical hardware associated with the host requesting the address. In any event, an IPv6 address is presented as sixteen sixteen-bit binary numbers (or, in other words, two bytes) with each sixteen-bit binary number or two bytes separated by a colon (:). Typically, each sixteen-bit binary number is represented by four hexadecimal characters, where each of the eight four hexadecimal character groupings are separated by the colon. For example, 2001:0 db8:85a3:0000:0000:8a2e:0370:7334 is a proper representation of an IPv6 address. IPv6 allows for some compression of zeros in the representation using a double colon (::). For example, the above IPv6 address may be represented as 2001:0 db8:85a3::8a2e:0370:7334.

In any event, an IPv6 address prefix identifies a subset of addresses with the IPv6 address space and those addresses may be assigned to devices within a particular area within subscriber network 18A. An IPv6 prefix usually identifies a contiguous set of IP addresses within the IP address space, as described above. IPv6 address prefix is denoted by a prefix followed by a subnet mask identifier (which in this instance may be represented as $56_{10}$ to indicate that the first 56 bits should be 1's within the subnet mask, e.g., FFFF:FFFF:FFFF:FF00), where the prefix and scope identifier may be separated by a slash (/). One example of IPv6 address prefix, ignoring the network prefix or first 64-bits as is common when referring to IPv6 address prefixes, is 0000:8a2e:0370:73/56. Edge router 12 therefore reserves a contiguous portion of addresses within the address pool for use by subscriber network 18A based on the DHCPv6 Solicit message and responds to the DHCPv6 Solicit message in one or two ways to allocate the IPv6 address prefix to subscriber network 18A.

However, before allocating the message, edge router 12 automatically determines a topology of the requesting subscriber network 18A based on the options parsed from the DHCPv6 Solicit message. For example, in response to an identity association (IA) prefix delegation (PD) or IA_PD option that requests an IPv6 address prefix be delegated to the requesting subscriber network, edge router 12 parses this option from the DHCPv6 solicit message and automatically determines that a residential gateway, such as residential gateway 20 is requesting an address prefix so as to then distribute, allocate or assign global IPv6 address from this prefix to one or more subscriber devices, such as subscriber device 22A-22N. With respect to subscriber network 18A, edge router 12 parses the DHCPv6 solicit message and determines that this DHCPv6 solicit message includes the IA_PD option to thereby automatically determine the topology of subscriber network 18A. Edge router 12, in response to the determined topology, then allocates or delegates a single address prefix in response to the DHCPv6 solicit message in accordance with either of the two ways for delegating addresses in DHCPv6.

As noted above, the DHCPv6 solicit message may include one or more options, including options for other types of identity associations (IA), such as an IA option for non-temporary address types (IA_NA option) and an IA option for temporary address types (an IA_TA option). Subscriber device 22Z, as one example, sends a DHCPv6 Solicit message with either or both of an IA_NA and/or IA_TA option, respectively. With respect to subscriber network 18N, edge router 12 therefore responds to this Solicit message in either of the two ways defined in DHCPv6 to assign, allocate or delegate one or more address of a single address prefix to subscriber device 22Z. Returning to the example of subscriber network 18A however residential gateway 20 may generate a DHCPv6 Solicit message that includes both an IA_PD option and either or both of an IA_TA option and/or IA_NA option, where the IA_PD option requests a prefix for use in allocating address to subscriber devices 22A-22N and the IA_TA and/or IA_NA options requests an address for one or more of LAN interfaces 24. More information regarding the various TLV options, messages and other aspect of DHCPv6 can be found in RFC 3315, entitled "Dynamic Host Configuration Protocol for IPv6 (DHCPv6)," dated July 2003, the contents of which are incorporated by reference as if fully set forth herein.

In accordance with the techniques set forth in this disclosure, edge router 12 assigns precedence to the IA_PD option so as to only assign the single IPv6 address prefix rather than allocate, delegate or otherwise assign a first prefix in response to the IA_PD option then assign one or more addresses of a second prefix different from the first prefix in response to the IA_TA and/or IA_NA options. In this respect, edge router 12 allocates one or more addresses within a single address prefix in response to DHCPv6 Solicit message based on the determined topology of the subscriber network so as to avoid allocating one or more addresses of a second address prefix.

Residential gateway 20, in this instance of two or more options, receives the single prefix, selects one or more of the IPv6 addresses from the single IPv6 address prefix allocated by edge router 12 and assigns these IPv6 addresses to the one or more LAN interfaces 24. Residential gateway 20 then allocates other addresses of the single address prefix to subscriber devices 22A-22N in response to DHCPv6 requests for global IPv6 subscriber addresses.

The techniques of this disclosure provide a number of benefits. For example, the techniques promote improved network management in that administrators of service provider networks configure edge routers to implement a single address prefix allocation policy with respect to a single address allocation mechanism, e.g., DHCPv6, rather than configure multiple address allocation mechanism, e.g., stateless address auto-configuration and DHCPv6. In this respect, the techniques promote more efficient network configuration, management and maintenance, as only one set of configuration data need be defined to implement the techniques. Further, the techniques reduce the number of prefixes that need be allocated per subscriber to one address prefix, thereby reducing inefficiencies that may result when two or more address prefixes are provisioned but only a subset of those two or more address prefixes are actually utilized by subscriber networks.

Figure 2:
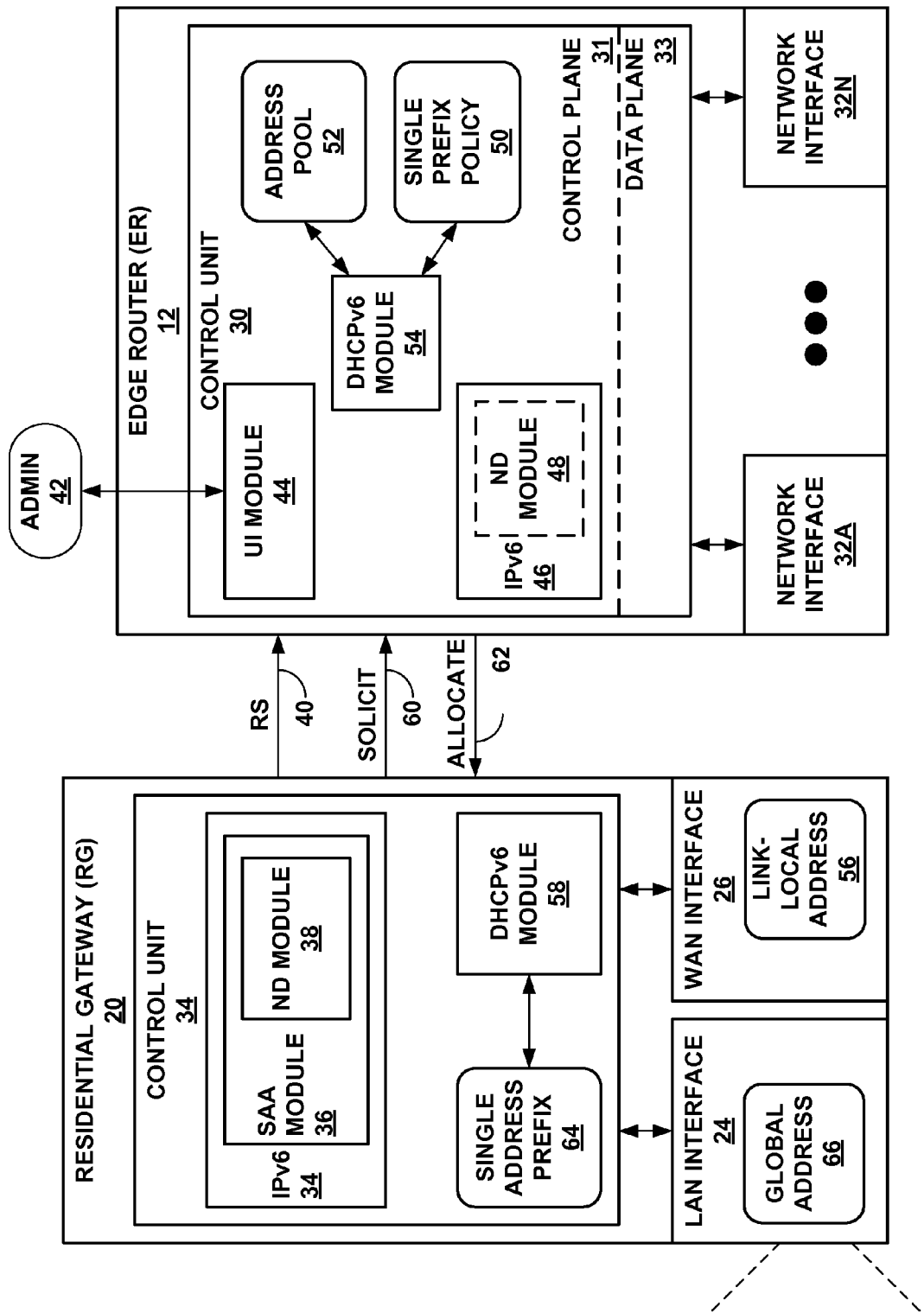
FIG. 2 is a block diagram illustrating the residential gateway and edge router of FIG. 1 in more detail.

FIG. 2 is a block diagram illustrating residential gateway 20 and edge router 12 of FIG. 1 in more detail. As noted above, residential gateway 20 may comprise a wireless router, a subscriber router, a cable modem, a digital subscriber line (DSL) modem, an optical line termination (OLT) device, a switch, a hub, or any other type of network device capable of implementing DHCPv6 or any other stateful address allocation mechanism. Edge router 12 represents one example of a network device that implements the techniques described in this disclosure. While described with respect to these two particular network devices, any type of network device may implement the techniques described herein so as to facilitate a single prefix allocation policy.

As shown in the example of FIG. 2, Edge router 12 includes a control unit 30 and a plurality of interfaces 32A-32N ("interfaces 32"). Typically, control unit 30 includes one or more processors (not shown in FIG. 2) that execute software instructions, e.g., a computer program, stored to a computer-readable storage medium (not shown in FIG. 2), such as a disk drive, optical drive, Flash memory or any other type of volatile or non-volatile memory, that cause a programmable processor, such as the processors of control unit 30, to perform the techniques described herein. In some implementations, however, control unit 30 comprises dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 30 is divided into two different functional partitions, which are represented in FIG. 2 by a control plane 31 and a data plane 33. Control plane 31 and data plane 33 may be implemented within control unit 30 as logical partitions or may each be implemented using dedicated hardware. Control plane 31 is also often referred to as a routing plane. Control plane 31 is generally responsible for receiving routing advertisements, resolving a network topology from the route advertisements to form a routing information base (RIB) and processing this RIB to select routes through the network. Data plane 33 is also often referred to as a forwarding plane, and in some instances, represents a packet forwarding engine. In any event, data plane 33 is generally responsible for forwarding packets or other discrete data units via the routes chosen by control plane 31. Control plane 31 installs the selected routes in a forwarding information base (FIB) stored and maintained by data plane 33. Data plane 33 receives a packet, as one example, parses the destination from the packet as well as other information, commonly referred to as a five-tuple, performs a lookup in the FIB to identify a next hop given the parsed destination, and forwards the packet to the identified next hop via the same or another one of network interfaces 32.

Network interfaces 32 represents any interface by which edge router 12 may send and receive network traffic and other information and/or communicate with other network devices. In some instances, network interfaces 32 each comprises an interface card or any other card for sending and receiving traffic and communicating with other network devices. In other instances, network interface 32 comprises one or more of an Ethernet port, a serial port, a Universal System Bus (USB) port, a Firewire port, or any other port by which data may be sent and received.

Similar to edge router 12, residential gateway 20 includes a control unit 34 that is similar to control unit 30. Control unit 34, like control unit 30, typically includes one or more processors (not shown in FIG. 2) that execute software instructions, e.g., a computer program, stored to a computer-readable storage medium (not shown in FIG. 2), such as a disk drive, optical drive, Flash memory or any other type of volatile or non-volatile memory, that cause a programmable processor, such as the processors of control unit 34, to perform the techniques described herein. In some implementations, however, control unit 34 comprises dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Residential gateway 20 further includes network interfaces 24 and 26, which are shown in FIG. 2 as "LAN interface 24" and "WAN interface 26." Local area network (LAN) interface 24 provides an interface by which to communicate with subscriber devices 22 of subscriber network 18A, which represents a local area network (LAN). Typically, LANs implement the Ethernet suite of protocols (e.g., IEEE 802.1x suite of protocols) as noted above for communicating within a distinct local network over a common communication medium shared by all devices of that local area network, e.g., subscriber network. Wide area network (WAN) interface 26 provides an interface to the wide area network represented in FIG. 1 as service provider network 14 and public network 16. While described with respect to these common names, the techniques may be implemented with respect to any type of network interface.

Initially, control unit 34 of residential gateway 20 (which is often abbreviated as "RG 20") powers up WAN interface 26 and invokes IPv6 module 34 ("IPv6 34") so as to discover a link layer address for use in communicating with neighboring devices, e.g., edge router 12. IPv6 module represents hardware or a combination hardware and software that implements IPv6 or portions thereof. As IPv6 defines a stateless address auto-configuration (SAA) address allocation mechanism, IPv6 module 34 includes an SAA module 36 also implements SAA. SAA module 36 therefore represents a hardware or combination hardware and software module that implements SAA of IPv6. According to IPv6, SAA involves the neighbor discovery protocol, which is also defined within IPv6. As a result, SAA module 36 includes a neighbor discovery (ND) module 38 ("ND module 38") that represents a hardware or combination hardware and software module that implements ND in accordance with IPv6.

In accordance with IPv6, SAA module 36 of IPv6 module 34 invokes ND module 38 to generate a route solicitation (RS) message 40 ("RS 40") in accordance with the neighbor discovery protocol (NDP) of IPv6. ND module 38 multicasts RS message 40 via WAN interface 26 to identify or discover neighboring routers, such as edge router 12. Edge router 12 (which is often abbreviated as "ER 12") receives this RS message 40 via one of network interfaces 32, which forwards RS message 40 to control unit 30. However, an administrator, such as administrator 42 ("admin 42"), interfaces with control unit 30 of edge router 12 to disable support of NDP within control unit 30.

In accordance with the techniques of this disclosure, admin 42 interfaces with a user interface (UI) module 44 ("UI module 44") of control unit 30. UI module 44 represents hardware or a combination of hardware and software that presents a user interface, such as a graphical user interface (GUI) or a command line interface (CLI), with which a user, such as admin 44, interacts to interface with control unit 30. In this instances, admin 42 interacts with a user interface presented by UI module 44 so as to configure an IPv6 module 46 ("IPv6 46") of control unit 30. IPv6 module 46, similar to IPv6 module 34 of RG 20, represents hardware or a combination of hardware and software that implements IPv6 or portions thereof. IPv6 module 46 includes a ND module 48 similar to ND module 38 of RG 20.

More particularly, admin 42 interacts with the user interface presented by UI module 44 to configure a single prefix policy 50, which involves disabling, at least, address allocation within ND module 48. ND module 48 is shown as a dashed-lined box to denote that at least a portion of ND module 48 has been disabled. In some instances, admin 42 interacts with this user interface to define, specify or otherwise enable single prefix policy 50, and control unit 30 automatically (e.g., without further user or admin 42 intervention) disables the address allocation portion of ND module 48 in response to enabling single prefix policy 50. Single prefix policy 50 represents data defining a single prefix configuration in which only a single address prefix within an address pool 52 maintained by a DHCPv6 module 54 of control unit 30 is allocated for use by each subscriber network 18 regardless of the network topology of these subscriber networks 18. DHCPv6 module 54 represents hardware or a combination of hardware and software that implements DHCPv6. Address pool 52 represents data that defines a plurality of contiguous or sequential IPv6 addresses reserved by edge router 12 for use in allocating addresses to requesting hosts. DHCPv6 module 54 of control unit 30 stores this data defining both address pool 52 and single prefix policy 50. While shown as storing data defining only one single prefix policy 50 for illustrative purposes, DHCPv6 module 54 may store two or more single prefix policies 50, where each policy 50 defines a particular address prefix reserved for allocation to a different or corresponding one of subscriber networks 18.

As ND module 48 is disabled in this manner within control unit 30 of ER 12, control unit 30 responds with an RA message that does not allocate any addresses. As the RA message is usually not relevant to address allocation, the RA message is not shown in FIG. 2. After receiving this router advertisement (RA) but not having been allocated an address via this message, SAA module 36 within control unit 34 of RG 20 determines a link-local address 56 in accordance with SAA and assigns, allocates, or otherwise associates this address with WAN interface 26. As described above, link-local address 56 limits the scope of communication within the network, as traffic originated by WAN interface 26 with link-local address 56 as the source address is limited to the WAN link between RG 20 and ER 12.

Meanwhile, control unit 34 of RG 20 also powers-up or otherwise enables LAN interface 24 and invokes DHCPv6 module 58, which is similar to DHCPv6 module 54, except that DHCPv6 module 58 implements host aspects of DHCPv6 rather than server or router aspects of DHCPv6. In this respect, HDCPv6 module 58 represents hardware or a combination of hardware and software that implements host aspect of DHCPv6. DHCPv6 module 58 generates a DHCPv6 Solicit message 60 ("Solicit 60"), which WAN interface 26 forwards to edge router 12. DHCPv6 module 58 generates DHCPv6 Solicit message 60 so as to include one or more type-length-value (TLV) options that each request a particular type of IPv6 address, as described above.

For example, DHCPv6 module 58 generates DHCPv6 Solicit message 60 to include an identity association prefix delegation (IA_PD) option that requests an IPv6 global address prefix comprising two or more sequential global IPv6 addresses. DHCPv6 module 58 includes this IA_PD option within Solicit message 60 so as to receive an IPv6 global address prefix from edge router 12 and then assign at least one global IPv6 address to each of subscriber devices 22A-22N. In some instances, DHCPv6 module 58 includes either one of an IA temporary address (IA_TA) option or an IA non-temporary address (IA_NA) option within DHCPv6 Solicit message 60 so as to request another IPv6 address for use by LAN interface 24. In any event, WAN interface 26 forwards this DHCPv6 Solicit message 60 to ER 12.

One of network interfaces 32 of ER 12 receives DHCPv6 Solicit message 60 and forwards this message 60 to control unit 30, which invokes DHCPv6 module 54 so as to process DHCPv6 Solicit message 60. DHCPv6 module 54 processes DHCPv6 Solicit message 60 in accordance with single prefix policy 50 so as to allocate one or more addresses of a single address prefix of address pool 52 in response to DHCPv6 Solicit message 60. Single prefix policy 50 defines a policy by which DHCPv6 allocates addresses based on the various options defined within the address request message, which is represented by DHCPv6 Solicit message 60 in the current example.

Single prefix policy 50, for example, indicates that an IA_PD option takes precedence over both an IA_NA option and an IA_TA option if both the IA_PD option and either or both of the IA_NA and IA_TA options are included within the same DHCPv6 Solicit message. In this example, DHCPv6 module 54 accesses single prefix policy 50 and allocates a single address prefix in response to the IA_PD option but does not allocate any other addresses in response to either or both of the IA_NA and IA_TA options. While shown in FIG. 3 to reflect this particular policy 50 that places precedence on the IA_PD option over both the IA_NA and IA_TA options, single prefix policy 50 may also be configured to place precedence over one or both of the IA_NA and IA_TA options over the IA_PD option, thereby allocating single network addresses in response to each of these options and not allocating the network address prefix in response to the IA_PD option. Single prefix policy 50, therefore, represents a flexible and configurable policy able to adapt to the needs of a particular network topology and/or configuration.

As another example, single prefix policy 50 indicates that a single address prefix be allocated in response to multiple IA_PD options such that DHCP module 54 only honors a single one of the multiple IA_PD options. As yet another example, single prefix policy 50 indicates that only addresses within a single address prefix be allocated in response to multiple IA_TA and/or IA_NA options so that DHCP module 54 only honors as many IA_TA and/or IA_NA options as the size of the single address prefix allocated for use by a given one of subscriber networks 18. In this respect, single prefix policy 50 comprises data that limits the allocation of addresses in response to address request messages to a single address prefix.

In other words, by virtue of these various options, DHCPv6 module 54 dynamically determines a topology of a requesting subscriber network. An IA_PD option in effect signals that a routing gateway, such as RG 20, is present within the requesting subscriber network 18A and positioned in front of other subscriber devices, while an IA_TA or IA_NA option indicates that a subscriber device, such as subscriber device 22Z, is directly connecting to ER 12. DHCPv6 module 54 uses these topology clues or hints that indicate the topology of the requesting subscriber network to then determine whether to allocate an entire address prefix or one or more addresses of the address prefix. However, regardless of the determined topology, single prefix policy 50 defines rules that ensures DHCPv6 module 54 only allocates a single address in response to DHCPv6 Solicit message. In this respect, admin 42 need not allocate more than one address prefix for each subscriber network 18, potentially reducing administrative costs. Moreover, admin 42 need not maintain multiple address allocation mechanisms as ND module 48 is disabled with any if little affect on the network, except for the assignment of link-local addresses to WAN interfaces within RG 20. This minor limitation however generally does not detract from a subscriber's service to any noticeable extent.

As mentioned above, DHCPv6 module 54 may respond to a DHCPv6 Solicit message 60 in one of two ways depending on whether the DHCPv6 Solicit message includes a "rapid commit" option. Regardless of which way the allocation proceeds, DHCPv6 module 54 reserves a single address prefix within address pool 52 in accordance with the techniques described in this disclosure and generates and forwards an address allocation message 62 ("ALLOCATE 62") to RG 20 via one of network interfaces 32. Considering that RG 20 issued DHCPv6 Solicit message 60, which included at least an IA_PD option, address allocation message 62 allocates an entire single address prefix 64. DHCPv6 module 58 receives this address allocation message 62, parses this address allocation message 62 to determine single address prefix 64, and stores this single address prefix 64. DHCPv6 module 58 allocates at least one global IPv6 address 66 from single address prefix 64 to LAN interface 24 in accordance with DHCPv6, considering that an IP_TA and/or IA_NA options were not honored by DHCPv6 module 54, as indicated by address allocation message 62. DHCPv6 module 58 then allocates one or more global IPv6 addresses of single address prefix to each of subscriber devices 22A-22N of subscriber network 18A in response to DHCPv6 Solicit messages sent by these subscriber devices 22A-22N. Accordingly, the techniques promote provisioning and allocation of a single address prefix per subscriber network without substantially the offering of network or Internet access to subscriber networks 18.

Figure 3:
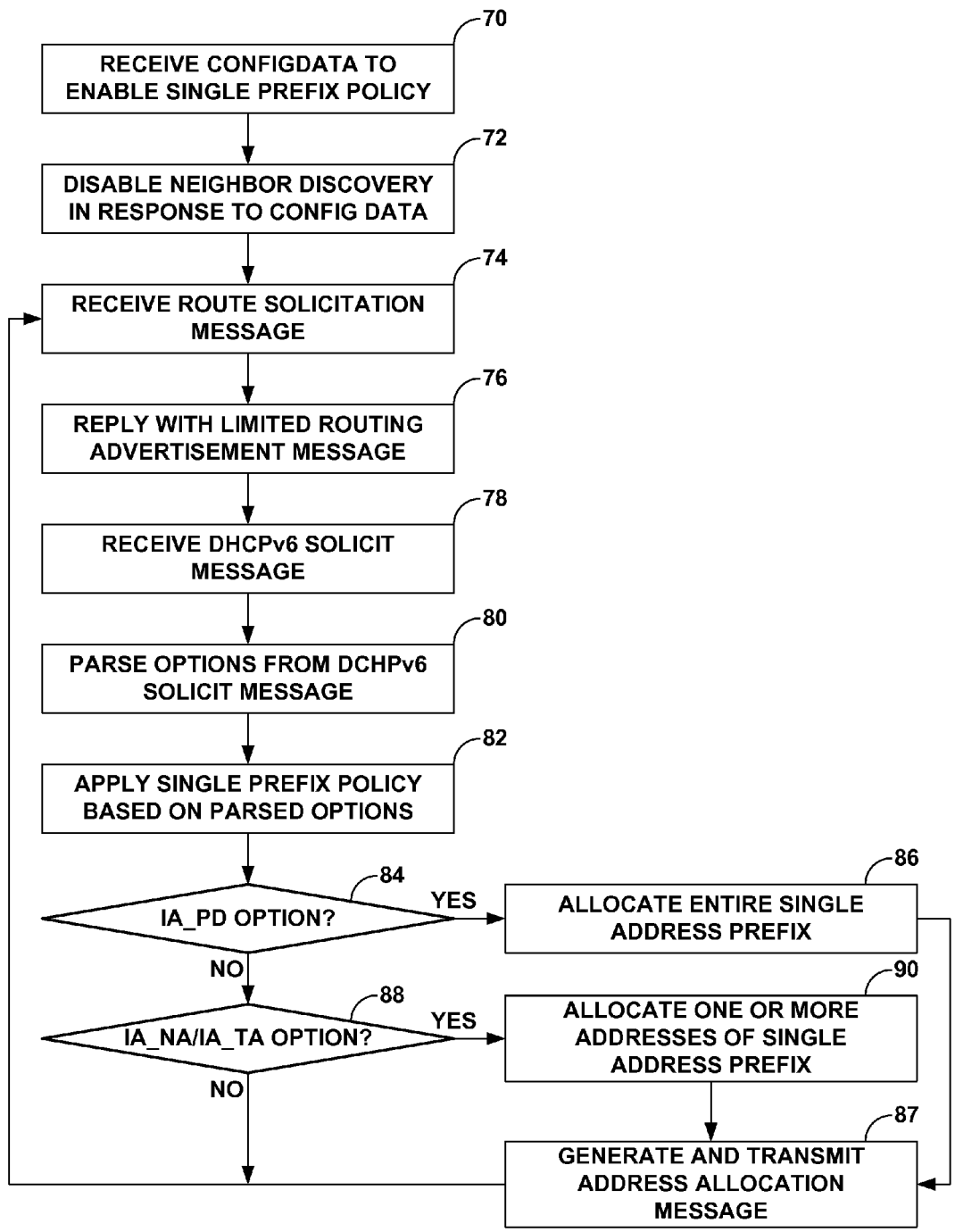
FIG. 3 is a flowchart illustrating example operation of a network device in performing various aspects of the techniques described in this disclosure.

FIG. 3 is a flowchart illustrating example operation of a network device, such as edge router 12 of FIG. 2, in performing various aspects of the techniques described in this disclosure. While described with respect to a particular network device, e.g., edge router 12, the techniques may be implemented by any type of network device that supports a stateful address allocation mechanism, such as DHCPv6.

Initially, edge router 12 and, more specifically, UI module 44 of control unit 30 included within edge router 12 presents a user interface with which admin 42 interacts to input configuration data defining a single prefix policy 50, as described above. In this exemplary manner, control unit 30 of edge router 12 receives configuration data defining single prefix policy 50 (70). In response to enabling or otherwise defining single prefix policy 50, control unit 30 automatically disables neighbor discovery (ND) module 48 of IPv6 module 46 so as to prevent allocation of global IPv6 addresses outside of a single IPv6 global address prefix (72). By disabling ND module 48, control unit 30 disables an address allocation mechanism referred to as stateless address auto-configuration (SAA).

However, a residential gateway, such as residential gateway 20, may attempt to use this SAA address allocation mechanism to request or otherwise determine a global IPv6 address for use by its WAN interface 26. For example, an IPv6 module 34 included within control unit 34 of residential gateway 20 typically invokes SAA module 36, which in turn, invokes ND module 38 to issue a router solicitation message 40 to edge router 12 in accordance with ND as set forth in IPv6. This router solicitation message 40 requests a routing prefix necessary to form a global IPv6 address. Edge router 12 receives this router solicitation message 40 but, considering that at least the address allocation mechanism of ND module 48 of edge router 12 replies with a "limited" RA message, as described above (74, 76). The RA message is limited in the sense that the RA message does not allocate a network address or network address prefix. As a result of not being allocated an address via the RA message, residential gateway 20 forms link-local address 56 and reserves this address for use by WAN interface 26, again as described above.

Next, edge router 12 receives a DHCPv6 Solicit message, such as DHCPv6 Solicit message 60, requesting that at least one global IPv6 address be reserved for use by a subscriber network, such as one of subscriber networks 18 (78). As noted above, this DHCPv6 Solicit message may be originated by a residential gateway, such as in the example shown in FIG. 2, or may be originated by a subscriber device, such as described in FIG. 1 with respect to subscriber device 22Z of subscriber network 18N. Depending on which device, e.g., residential gateway 20 or subscriber device 22Z, originated the DHCPv6 Solicit message, the originating device specifies different type-length-value (TLV) options within the DHCPv6 Solicit message.

Considering first DHCPv6 Solicit message 60 originated by DHCPv6 module 58 of control unit 34 included within residential gateway 20, DHCPv6 module 58 typically includes an IA_PD option by which to request an entire IPv6 global address prefix for use by subscriber devices 22A-22N and one or more IA_NA and/or IA_TA options by which to request one or more global IPv6 addresses for use by LAN interfaces that present an interface to subscriber devices 22A-22N, such as LAN interface 24. DHCPv6 module 54 receives this DHCPv6 Solicit message 60 and parses the IA_PD and IA_TA and/or IA_NA options from the DHCPv6 Solicit message 60 (80). DHCPv6 module 54 then applies single (address) prefix policy 50 based on these parsed options (82). In accordance with single prefix policy 50, DHCPv6 module 54 first determines whether the parsed options include an IA_PD option (84). In the even DHCPv6 module 54 determines in this instance that the parsed options include the IA_PD option ("YES" 84), DHCPv6 module 54 allocates an entire address prefix for use by residential gateway 20 and generates and transmits an address allocation message 62 allocating this single address prefix (e.g., a /48 or a /56 prefix) for use by residential gateway 20, as described above (86, 87). Having only the IA_PD option set is viewed by edge router 12 to be an indication that the subscriber network includes a residential gateway which, in this case, does not want an address for its WAN interface but instead wants a prefix from which the residential gateway may allocate an address for its WAN interface. DHCPv6 module 54 does not take into consideration any other requests for global IPv6 addresses, such as the additional IA_NA and/or IA_TA options included within DHCPv6 Solicit message 60 so as to effectively deny or reject the requests and avoid allocating any addresses outside of the single address prefix.

Residential gateway 20 compensates for this denial of the additional IA_NA and/or IA_TA options by reserving at least one global IPv6 address of the allocated IPv6 global address prefix for use by LAN interface 24. FIG. 2 shows this reservation of at least one global IPv6 address as global address 66, which is included within LAN interface 24. DHCPv6 module 58 stores allocated single address prefix as single address prefix 64 and allocates one or more global IPv6 addresses from this single address prefix 64 in response to address requests from subscriber devices 22A-22N.

However, subscriber device 22Z of subscriber network 18N generates a different DHCPv6 Solicit message in that subscriber device 22A generates a DHCPv6 solicit message that typically includes one or more IA_NA and/or IA_TA options but not an IA_PD option. Having the IA_NA and/or IA_TA options set but not the IAPD option is viewed by edge router 12 to be an indication that the subscriber network includes only a host without having an intermediate residential gateway. In this instance, DHCPv6 module 54 determines first, in accordance with single prefix policy 50, that the parsed options do not include an IA_PD option ("NO" 86), but that the parsed options include one or more IA_NA and/or IA_TA options ("YES" 88). In this instance, DHCPv6 module 54 allocates one or more address (e.g., a /64 prefix) of the single provisioned address prefix to subscriber device 22Z and generates and transmits an address allocation message, similar to address allocation message 62, to subscriber device 22Z, as described above (90, 87). In some cases, the address may be generated from an address prefix received from a radius server. For example, router 12 may allocate an address (i.e., a /64 prefix) from a /48 or /56 prefix received from the radius server.

In this manner, DHCPv6 module 54 effectively determines a network topology of subscriber networks 18 based on the parsed options. Depending on the determined network topology, DHCPv6 module 54 intelligently determines whether to allocate an entire address prefix or a subset of the addresses included within this address prefix. Regardless of the determined network topology however, DHCPv6 module 54 does not allocate any addresses that reside out of this address prefix, thereby enabling service providers to provision only or no more than a single address prefix per subscriber network. This single address prefix policy reduces administrative burdens and potentially improves network performance by limiting address over-provisioning.

In some instances, edge router 12 can be configured to implement the single prefix allocation techniques in a different manner. For example, if the RS message comes first, edge router 12 may be configured to response to the RS message with an RA message that does allocated an address to residential gateway 20 and then not allocate a message in response to the DHCPv6 Solicit message. Alternatively, edge router 12 may not immediate response to the RS message with the RA message but wait for the DHCPv6 Solicit message. Upon receiving the DHCPv6 Solicit message, edge router 12 may be configured to either allocate the one or more addresses or address prefix via the RA message or the DHCPv6 address allocation message. If the DCHPv6 Solicit message, however, is not received before a certain amount of time (e.g., as designated by a timer), edge router 12 may allocate the address via an unsolicited RA message. In this manner, the single address allocation techniques described herein may be implemented in a highly configurable fashion to permit adaptability to a number of different network topologies and configurations.

Figure 4:
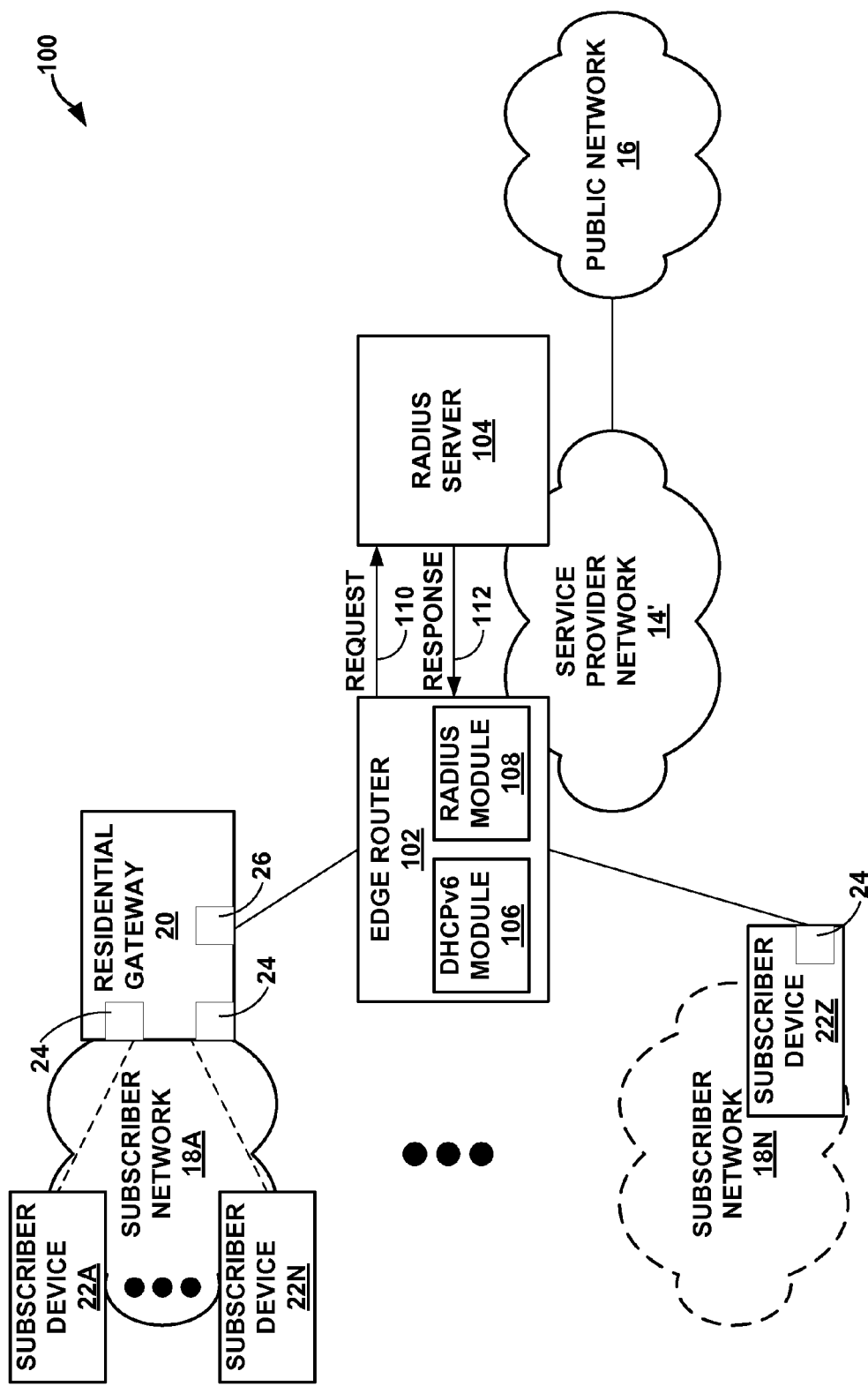
FIG. 4 is a block diagram illustrating another exemplary network system that implements the single prefix allocation techniques described in this disclosure.

FIG. 4 is a block diagram illustrating another exemplary network system 100 that implements the single prefix allocation techniques described in this disclosure. Network system 100 is similar to network system 10 of FIG. 1 in that network system 100 includes a service provider network 14', a public network 16 and subscriber networks 18. Service provider network 14' however includes both an edge router 102, which may be similar to edge router 12, and a Remote Authentication Dial-In User Service (RADIUS) server 104 ("RADIUS server 104"). Edge router 102 is similar to edge router 12 in most, if not all aspects, except that edge router 102 also includes a RADIUS module 108 within a control plane of a control unit (not shown in FIG. 4, but assumed to be similar to control plane 31 of control unit 30 for purposes of illustration) for performing user authentication in accordance with RADIUS.

RADIUS server 104 represents one example of a network device referred to as an authentication server that implements a particular type of authentication, authorization, and accounting (AAA) protocol referred to as a RADIUS protocol. The RADIUS protocol enables AAA transactions by which a network access device, such as edge router 12, may authenticate and authorize an endpoint device, such as subscriber devices 22. Further information regarding RADISU can be found in RFC 2864, titled "Remote Authentication Dial In User Service (RADIUS)," prepared by the Network Working Group of the Internet Engineering Task Force (IETF), dated June 2000, and herein incorporated by reference. While described with respect to RADIUS, the techniques may also be implemented with respect to another AAA protocol referred to as "diameter," which is an improved version of RADIUS, or any other AAA protocol that enables authentication of subscriber devices 22.

In the example of FIG. 4, edge router 102 receives RS message, such as RS message 40 shown in FIG. 2 and responds, in some instances, with a "limited" RA message. Upon receiving a DHCPv6 Solicit message, such as DHCPv6 Solicit message 60, edge router 102 invokes DHCPv6 module 106 and verifies that the subscriber network, e.g., subscriber network 18A, has been authorized to access service provider network 14'. DHCPv6 module 106 performs this verification through interacts with RADIUS module 108, where RADIUS module 108 typically stores and maintains data identifying which endpoint devices have been authenticated to access service provider network 14'. If RADIUS module 108 determines that residential gateway 20 has not been previously authenticated, RADIUS module 108 issues an authentication request message 110 to RADIUS server 104 requesting authentication. Often, residential gateway 20 provides credentials or other authentication information in DHCPv6 Solicit message 60, possibly via TLV options, that DHCPv6 module 106 passes to RADIUS module 108. RADIUS module 108 passes these credentials or other authentication information to RADIUS server 104 via authentication request message 110.

In this topology, RADIUS sever 104 often stores data defining the address pool, e.g., address pool 52, rather than DHCPv6 module 106, as RADIUS server 104 is typically centrally located within the network and interfaces with a plurality of edge routers 102. Upon successfully authenticating residential gateway 20 or, more generally, subscriber network 18, RADIUS server 104 delegates a single address prefix for use by subscriber network 18A in an authentication response message 112. If not successfully authentication, RADIUS server 104 does not delegate a single address prefix, effectively denying subscriber network 18A from accessing service provider network 14' and public network 16. In any event, RADIUS server 104 may embed the single address prefix in a RADIUS attribute, which is the moniker given to TLV fields or options in the RADIUS protocol. More information regarding this attribute and delegating IPv6 address prefixes is available in RFC 4818, titled "RADIUS Delegated-IPv6-Prefix Attribute," dated April, 2007, the entire contents of which are herein incorporated as if fully set forth herein.

Regardless, RADIUS module 108 receives this response message 112, parses the single global IPv6 address prefix delegated by RADIUS server 104 and forwards this global IPv6 address prefix to DHCPv6 module 106. DHCPv6 module 106 then allocates either the entire single address prefix or a subset of addresses within the single address prefix in accordance with the single address prefix allocation techniques described in this disclosure. In this respect, the techniques facilitate provisioning of address prefixes within radius server 104, as an administrator, such as admin 42, need only configure RADIUS server 104 to delegate a single, rather than multiple, address prefix per subscriber network 18.

While the techniques of this disclosure are described with respect to edge router 102, RADIUS server 104 may implement the single address allocation techniques rather than edge router 102. In this instance, RADIUS server 104 implement single prefix policy 50 and DHCPv6 module 106 relays the various IA_PD, IA_NA and IA_TA options to RADIUS server 104. RADIUS server 104 then applies single prefix policy 50 to delegate an address of the single address prefix or the entire address prefix based on the received options.

Figure 5:
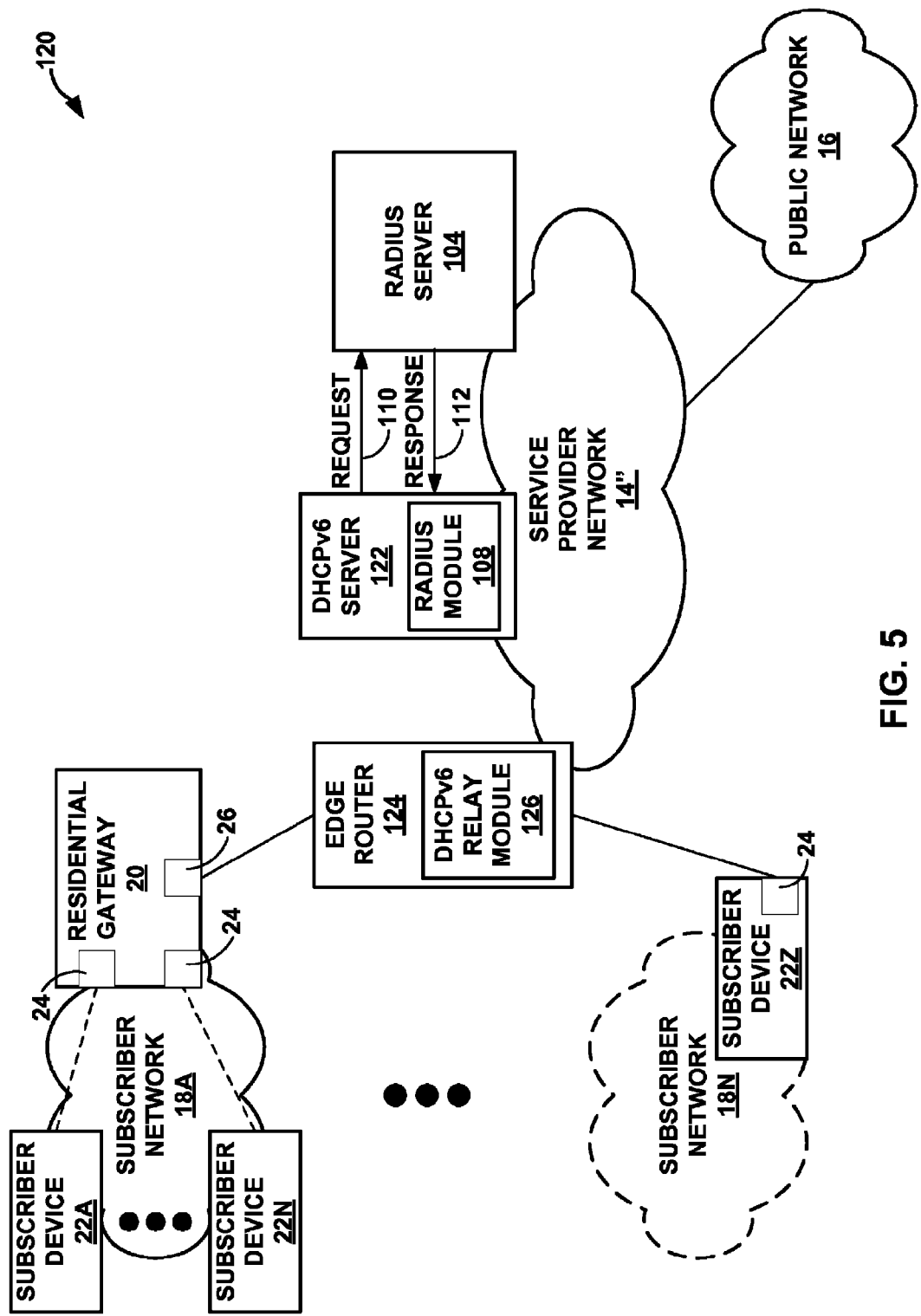
FIG. 5 is a block diagram illustrating yet another exemplary network system that implements the single prefix allocation techniques described in this disclosure.

FIG. 5 is a block diagram illustrating yet another exemplary network system 120 that implements the single prefix allocation techniques described in this disclosure. Network system 120 is similar to network system 100 in that it includes a service provider network 14", public network 116 and subscriber network 18. Subscriber network 14", however, includes a separate or stand-alone DHCPv6 server 122, as well as, an edge router 124 and a RADIUS server 104. Edge router 124 is similar to edge router 102, except that edge router 124 includes a DHCPv6 relay module 126 instead of a DHCPv6 module 106 and does not include a RADIUS module 108. DHCPv6 relay module 126 implements relay aspect of DHCPv6 so as to relay or forward DHCPv6 Solicit and other messages between DHCPv6 server 122 and subscriber networks 18. Edge router 124 is assumed to include a control unit and interfaces similar to control unit 30 and interfaces 32 shown in the example of FIG. 2. Stand-alone DHCPv6 server 122 implements the functionality of DHCPv6 module 106 and includes RADIUS module 108 to interface with RADIUS server 104 in the manner described above with respect to the example of FIG. 4.

In the example of FIG. 5, edge router 124 receives an RS message, such as RS message 40 from residential gateway 20 and responds, as described above, with a "limited" RA message. In response to receiving a DHCPv6 Solicit message, such as DHCPv6 Solicit message 60 from residential gateway 20, edge router 124 and, more specifically, DHCPv6 relay module 126 performs in various aspects the single prefix allocation techniques described in this disclosure to remove those TLV options in accordance with a single address prefix policy 50 to avoid allocation of addresses from more than one IPv6 address prefix. For example, DHCPv6 Solicit message 60 is assumed above for illustrates to include both the IA_PD and IA_TA and/or IA_NA options. DHCPv6 relay module 126 applies single prefix policy 50 to remove the IA_TA and/or IA_NA options from DHCPv6 Solicit message 60 so as to prevent DHCPv6 server 122 from assigning or otherwise allocating addresses from more than one address prefix in response to these options. In this respect, edge router 124 still implements the single prefix allocation techniques described in this disclosure despite acting only as a DHCPv6 relay agent. Alternatively, DHCPv6 server 122 and/or RADIUS server 104 may implement the techniques described in this disclosure as discussed above with respect to FIG. 4.

Various embodiments of the invention have been described. These and other embodiments are within the scope of the following claims.

The invention claimed is:

1. A method of address allocation within a computer network, the method comprising:
  receiving, with a network device of the computer network, a message from a subscriber network,
  in response to determining that the message includes a request that a network address be allocated to the subscriber network in accordance with a stateful address allocation mechanism without the message including any other requests that a single network address prefix be allocated to the subscriber network, allocating a network address of a single network address prefix associated with the subscriber network to the subscriber network with the network device;

in response to determining that the message includes the request that the single network address prefix be allocated to the subscriber network in accordance with the stateful address allocation mechanism without the message including any other requests that the network address be allocated to the subscriber network, allocating the entire single network address prefix with the network device to the subscriber network; and in response to determining that the message includes the request that the network address be allocated to the subscriber network in accordance with the stateful address allocation mechanism and the message includes the request that the single network address prefix be allocated to the subscriber network in accordance with the stateful address allocation mechanism, allocating, with the network device, the entire single network address prefix to the subscriber network in response to the request that the single network address prefix be allocated to the subscriber network so as to avoid allocating one or more addresses from another network address prefix different from the single network address prefix.

2. The method of claim 1, wherein the request that a network address be allocated to the subscriber network includes only option fields of type identity association temporary address (IA_TA) or identity association non-temporary address (IA_NA) and not of type identity association prefix delegation (IA_PD), wherein the request that the single network address prefix be allocated to the subscriber network includes an identity association prefix delegation (IA_PD) option field, and wherein the method further comprises:

determining that the message includes a request that a network address be allocated to the subscriber network in accordance with a stateful address allocation mechanism without including any other requests that a single network address prefix be allocated to the subscriber network when the message includes the option fields of type IA_TA or IA_NA without including other option fields of type IA_PD, determining that the message includes the request that the single network address prefix be allocated to the subscriber network in accordance with the stateful address allocation mechanism without including any other requests that the network address be allocated to the subscriber network when the message the message includes the option fields of type IA_PD without including other option fields of type IA_TA or IA_NA, and determining that the message includes both the request that the network address be allocated to the subscriber network in accordance with the stateful address allocation mechanism and the request that the single network address prefix be allocated to the subscriber network in accordance with the stateful address allocation mechanism when the message includes the option fields of type IA_PD and at least one of the option fields of type IA_TA and IA_NA.

3. The method of claim 1, receiving a message comprises receiving, with the network device, the message from a residential gateway device, wherein the message includes a request that the network address prefix be allocated to the residential gateway device in accordance with the stateful address allocation mechanism so as to enable the residential gateway device to allocate the one or more addresses of the requested network address prefix to one or more subscriber network devices located within the subscriber network, and allocating, with the network device, the entire single network address prefix to the residential gateway device in response to the request of the second message that the network address prefix be allocated to the residential gateway device without allocating an address in response to any request in another message for a network address using a stateless address allocation mechanism or the any other request in the second message for a network address so as to avoid allocating the one or more addresses from another network address prefix different form the single network address prefix to an interface of the residential gateway device facing the network device.

4. The method of claim 1, further comprising receiving, with the network device, a neighbor discover router solicitation (ND/RS) message from the subscriber network prior to receiving the message, wherein the ND/RS message requests allocation of the network address to the subscriber network in accordance with a stateless address auto-configuration address allocation mechanism, and wherein receiving a message comprises receiving, with the network device, a dynamic host configuration protocol version 6 (DHCPv6) solicit message from the subscriber network, wherein DHCPv6 solicit message includes a first request that network address be allocated to the subscriber network in accordance with the stateful address allocation mechanism and a second request that a network address prefix be allocated to the subscriber network in accordance with the stateful address configuration address allocation mechanism.

5. The method of claim 4, further comprising generating and forwarding a neighbor discover routing advertisement (ND/RA) message in response to the ND/RS message, wherein the ND/RA message does not allocate any network addresses.

6. The method of claim 4, wherein the first request of the DHCPv6 solicit message that a network address be allocated to the subscriber network includes a first option field and the second request of the DHCPv6 solicit message includes a second option field different from the first option field, wherein the first option field designates a first scope of the address allocation request, and wherein the second option field designates a second scope of the address allocation request that is different from the first scope of the address allocation request, wherein the first scope of the address allocation request is for either a single temporary address (TA) or a single non-temporary address (NA), wherein the second scope of the address allocation request is for a prefix delegation (PD), wherein allocating the single network address prefix in response to determining that the message includes both the request that the network address be allocated to the subscriber network in accordance with the stateful address allocation mechanism and the request that the single network address prefix be allocated to the subscriber network in accordance with the stateful address allocation mechanism comprises allocating, with the network device, the entire single network address prefix to the residential gateway device in response to the determination that the DHCPv6 solicit message includes both the first option field and the second option field.

7. The method of claim 1, further comprising storing data that defines a single address prefix policy within the network device, wherein the single address prefix policy provisions only the single network address prefix for use by the subscriber network to prevent allocation of two or more network address prefixes for use by the subscriber network.

8. The method of claim 1,
wherein the computer network comprises an access network of a service provider network that enables one or more subscriber devices of the subscriber network to access a public computer network, and
wherein the network device comprises an edge router located at the edge of the service provider network.

9. A network device that allocates addresses within a computer network, the network device comprising:
at least one interface that receives a message from a subscriber network connected to the computer network; and
a control unit comprising a processor configured to:
in response to determining that the message includes a request that a network address be allocated to the subscriber network in accordance with a stateful address allocation mechanism without including any other requests that a single network address prefix be allocated to the subscriber network, allocate a network address of a single network address prefix associated with the subscriber network to the subscriber network with the network device;
in response to determining that the message includes the request that the single network address prefix be allocated to the subscriber network in accordance with the stateful address allocation mechanism without including any other requests that the network address be allocated to the subscriber network, allocate the entire single network address prefix with the network device to the subscriber network; and
in response to determining that the message includes both the request that the network address be allocated to the subscriber network in accordance with the stateful address allocation mechanism and the request that the single network address prefix be allocated to the subscriber network in accordance with the stateful address allocation mechanism, allocate, with the network device, the entire single network address prefix to the subscriber network the request that the single network address prefix be allocated to the subscriber network so as to avoid allocating one or more addresses from another network address prefix different from the single network address prefix.

10. The network device of claim 9,
wherein the request that a network address be allocated to the subscriber network includes only option fields of type identity association temporary_address (IA_TA) or identity association non-temporary address (IA NA) and not of type identity association prefix delegation (IA PD),
wherein the request that the single network address prefix be allocated to the subscriber network includes an identity association prefix delegation (IA_PD) option field, and wherein the processor further determines that 1) the message includes a request that a network address be allocated to the subscriber network in accordance with a stateful address allocation mechanism without including any other requests that a single network address prefix be allocated to the subscriber network when the message includes the option fields of type IATA or IA NA without including~ other option fields of type IAPD, 2) the message includes the request that the single network address prefix be allocated to the subscriber network in accordance with the stateful address allocation mechanism without including any other requests that the network address be allocated to the subscriber network when the message the message includes the option fields of type IA_PD without including other option fields of type IA_TA or IA_NA, and
3) the message includes both the request that the network address be allocated to the subscriber network in accordance with the stateful address allocation mechanism and the request that the single network address prefix be allocated to the subscriber network in accordance with the stateful address allocation mechanism when the message includes the option fields of type IA PD and at least one of the option fields of type IA TA and IA NA.

11. The network device of claim 9,
wherein the at least one interface receives the message from the residential gateway device, wherein the message includes the request that the network address prefix be allocated to the residential gateway device in accordance with the stateful address allocation mechanism so as to enable the residential gateway device to allocate the one or more addresses of the requested network address prefix to one or more subscriber network devices located within the subscriber network, and
wherein the processor allocates the entire single network address prefix to the residential gateway device in response to the request of the second message that the network address prefix be allocated to the residential gateway device without allocating an address in response to any request in another message for a network address using a stateless address allocation mechanism or any other request in the second message for a network address so as to avoid allocating the one or more addresses from another network address prefix different form the single network address prefix to an interface of the residential gateway device facing the network device.

12. The network device of claim 9,
wherein the at least one interface receives a neighbor discover router solicitation (ND/RS) message from the subscriber network prior to receiving the message, wherein the ND/RS message requests the network address be allocated to the subscriber network in accordance with an stateless address auto-configuration address allocation mechanism, and
wherein the at least one interface receives the message as a dynamic host configuration protocol version 6 (DHCPv6) solicit message from the subscriber network, wherein DHCPv6 solicit message includes a first request that a network address be allocated to the subscriber network in accordance with a stateful address allocation mechanism and a second request that a network address prefix be allocated to the subscriber network in accordance with the stateful address configuration address allocation mechanism.

13. The network device of claim 12, wherein the processor includes an Internet protocol version 6 (IPv6) module comprising a neighbor discover (ND) module that generates and forwards a neighbor discover routing advertisement (ND/RA) message in response to the ND/RS message, wherein the ND/RA message does not allocate any network addresses.

14. The network device of claim 12,
wherein the first request of the DHCPv6 solicit message includes a first option field and the second request of the DHCPv6 solicit message includes a second option field different from the first option field, wherein the first option field designates a first scope of the address allocation request, and wherein the second option field designates a second scope of the address allocation request that is different from the first scope of the address allocation request, wherein the first scope of the address allocation request is for either a single temporary address (TA) or a single non-temporary address (NA), wherein the second scope of the address allocation request is for a prefix delegation (PD), wherein the processor includes a DHCPv6 module that allocates the entire single network address prefix to the residential gateway device in response to the determination the DHCPv6 solicit message includes both the first option field and the second option field.

15. The network device of claim 9, wherein the processor further stores data that defines a single address prefix policy within the network device, wherein the single address prefix policy provisions only the single network address prefix for use by the subscriber network to prevent allocation of two or more network address prefixes for use by the subscriber network.

16. The network device of claim 9,
wherein the computer network comprises an access network of a service provider network that enables one or more subscriber devices of the subscriber network to access a public computer network, and
wherein the network device comprises an edge router located at the edge of the service provider network.

17. A non-transitory computer-readable storage medium comprising instructions for causing a programmable processor to:
receive a message from a subscriber network;
in response to determining that the message includes a request that a network address be allocated to the subscriber network in accordance with a stateful address allocation mechanism without including any other requests that a single network address prefix be allocated to the subscriber network, allocate a network address of a single network address prefix associated with the subscriber network to the subscriber network;
in response to determining that the message includes the request that the single network address prefix be allocated to the subscriber network in accordance with the stateful address allocation mechanism without including any other requests that the network address be allocated to the subscriber network, allocate the entire single network address prefix to the subscriber network; and
in response to determining that the message includes both the request that the network address be allocated to the subscriber network in accordance with the stateful address allocation mechanism and the request that the single network address prefix be allocated to the subscriber network in accordance with the stateful address allocation mechanism, allocate, with the network device, the entire single network address prefix to the subscriber network the request that the single network address prefix be allocated to the subscriber network so as to avoid allocating one or more addresses from another network address prefix different from the single network address prefix.

18. A network system comprising:
a public network;
a subscriber network that includes a residential gateway device; and
a service provider network comprising a network device that interfaces with the residential gateway device to enable the subscriber network to access the public network,
wherein the network device comprises:
at least one interface that receives a message from the subscriber network connected to the service provider network; and
a control unit comprising a processor that, in response to determining that the message includes a request that a network address be allocated to the subscriber network in accordance with a stateful address allocation mechanism without including any other requests that a single network address prefix be allocated to the subscriber network, allocates a network address of a single network address prefix associated with the subscriber network to the subscriber network with the network device, in response to determining that the message includes the request that the single network address prefix be allocated to the subscriber network in accordance with the stateful address allocation mechanism without including any other requests that the network address be allocated to the subscriber network, allocates the entire single network address prefix with the network device to the subscriber network, and, in response to determining that the message includes both the request that the network address be allocated to the subscriber network in accordance with the stateful address allocation mechanism and the request that the single network address prefix be allocated to the subscriber network in accordance with the stateful address allocation mechanism, allocates, with the network device, the entire single network address prefix to the subscriber network the request that the single network address prefix be allocated to the subscriber network so as to avoid allocating one or more addresses from another network address prefix different from the single network address prefix.

19. A network system comprising:
a public network;
a subscriber network that includes a residential gateway device;
a service provider network that provides access to the public network, wherein the service provider network comprises:
an authentication server that authenticates the one or more subscriber networks before allowing the subscriber networks to gain access to the service provider network; and
a network device that interfaces with the residential gateway device to enable the subscriber network to access the public network, wherein the network device comprises:
at least one interface that receives a message from the subscriber network connected to the service provider network;
a control unit comprising a processor that communicates with the authentication server to authenticate the subscriber network as permitted to interface with the service provider network to access the public network, receives a single network address prefix from the authentication server in response to successfully authenticating the subscriber network, in response to determining that the message includes a request that a network address be allocated to the subscriber network in accordance with a stateful address allocation mechanism without including any other requests that a single network address prefix be allocated to the subscriber network, allocates a network address of a single network address prefix associated with the subscriber network to the subscriber network with the network device, in response to determining that the message includes the request that the single network address prefix be allocated to the subscriber network in accordance with the stateful address allocation mechanism without including any other requests that the network address be allocated to the subscriber network, allocates the entire single network address prefix with the network device to the subscriber network, and, in response to determining that the message includes both the request that the network address be allocated to the subscriber network in accordance with the stateful address allocation mechanism and the request that the single network address prefix be allocated to the subscriber network in accordance with the stateful address allocation mechanism, allocates, with the network device, the entire single network address prefix to the subscriber network the request that the single network address prefix be allocated to the subscriber network so as to avoid allocating one or more addresses from another network address prefix different from the single network address prefix.

20. A network system comprising:

a public network;

a subscriber network that includes a residential gateway device;

a service provider network that provides access to the public network, wherein the service provider network includes:

a network device that interfaces with the residential gateway device to enable the subscriber network to access the public network;

a dynamic host configuration protocol version six (DHCPv6) server positioned intermediate to the network device and the authentication server that allocates network addresses in accordance with DHCPv6, wherein the network device comprises:

at least one interface that receives a message from the subscriber network connected to the service provider network, wherein the message includes a first request that a network address be allocated to the subscriber network in accordance with a stateful address allocation mechanism and a second request that a network address prefix be allocated to the subscriber network in accordance with the stateful address allocation mechanism; and a control unit comprising a processor that parses the message in accordance with a single prefix allocation policy to selectively remove one or more options related to the scope of the address allocation request to generate an updated message, forwards the updated message to the DHCPv6 server, receives a response message from the DHCPv6 server allocating a single network address prefix in response to the second request of the updated message without allocating one or more network addresses in response to the first request of the message so as to avoid allocating one or more addresses from another network address prefix different from the single network address prefix.

\* \* \* \* \*